June 19, 1956 K. E. LYMAN 2,750,813
DIFFERENTIAL GEAR SET
Filed Aug. 24, 1953

INVENTOR:
Kenneth E. Lyman,
BY
Bair, Freeman & Molinare
ATTORNEYS.

United States Patent Office 2,750,813
Patented June 19, 1956

2,750,813

DIFFERENTIAL GEAR SET

Kenneth E. Lyman, Hinsdale, Ill.

Application August 24, 1953, Serial No. 376,108

10 Claims. (Cl. 74—711)

This invention relates to differential gear sets and more particularly to a bevel gear differential of the type commonly employed on automotive vehicles.

One of the major difficulties with differentials is absorption of radial thrust on the differential pinions. Normally this thrust has been taken through the housing by means of thrust bearings and this requires a relatively heavy housing which is accurately formed. Furthermore, in variable ratio differentials wherein the pivots for the pinions shift relative to the housing it becomes almost impossible to provide adequate bearings without unduly increasing the size and cost of the bearings.

Another difficulty has been in transmitting the side thrust between the axle shafts. Transmission of side thrust through the gears increases the radial thrust on the pinions and complicates the bearing problem. Use of floating blocks as heretofore employed has not been satisfactory due to their cost and difficulty of mounting and the fact that they frequently shear the pins connecting the pinions.

It is one of the objects of the present invention to provide a differential in which outward thrust on the pinions is taken directly by the side gears.

According to one feature the pinions carry thrust rings which register with the inner ends of the teeth on the side gears to engage the teeth or a washer overlying them thereby to hold the pinions against radial outward movement.

Another object is to provide a differential in which the pinions are held against outward movement by engagement with the side gears and are connected to the housing through eccentric hubs and sliding blocks which are not required to absorb any radial thrust.

A further object is to provide a differential in which the pinions are held against outward movement by engagement with the side gears and inward movement of the shafts into the side gears is limited so that thrust is transmitted through the gears.

Figure 1:
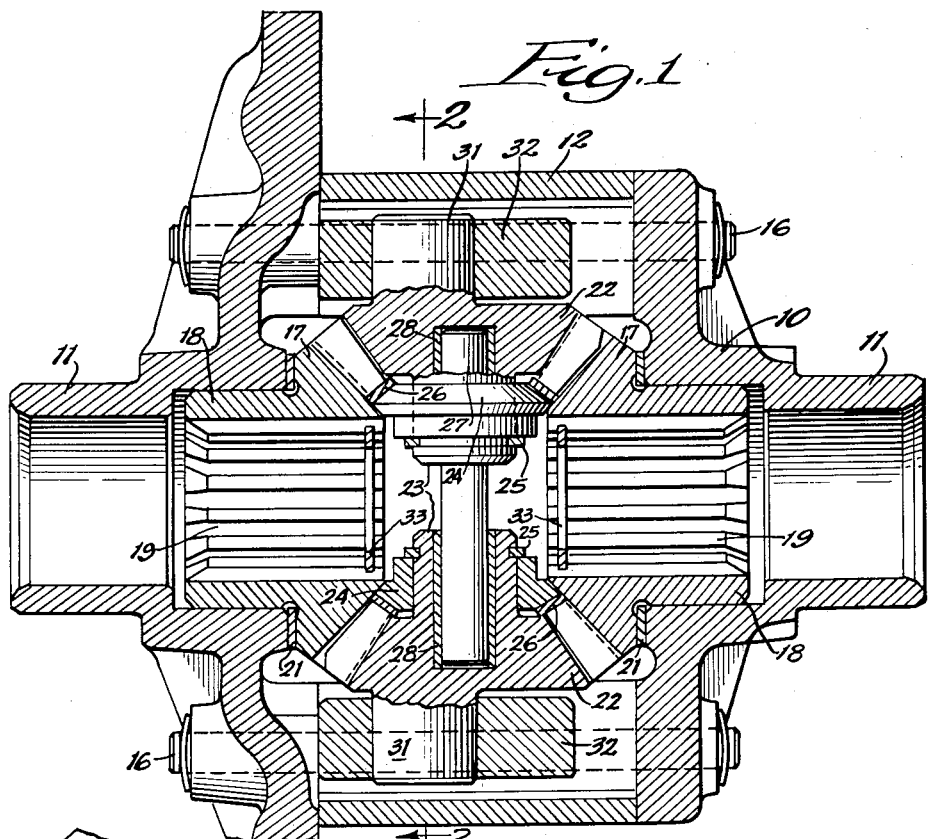
Figure 2:
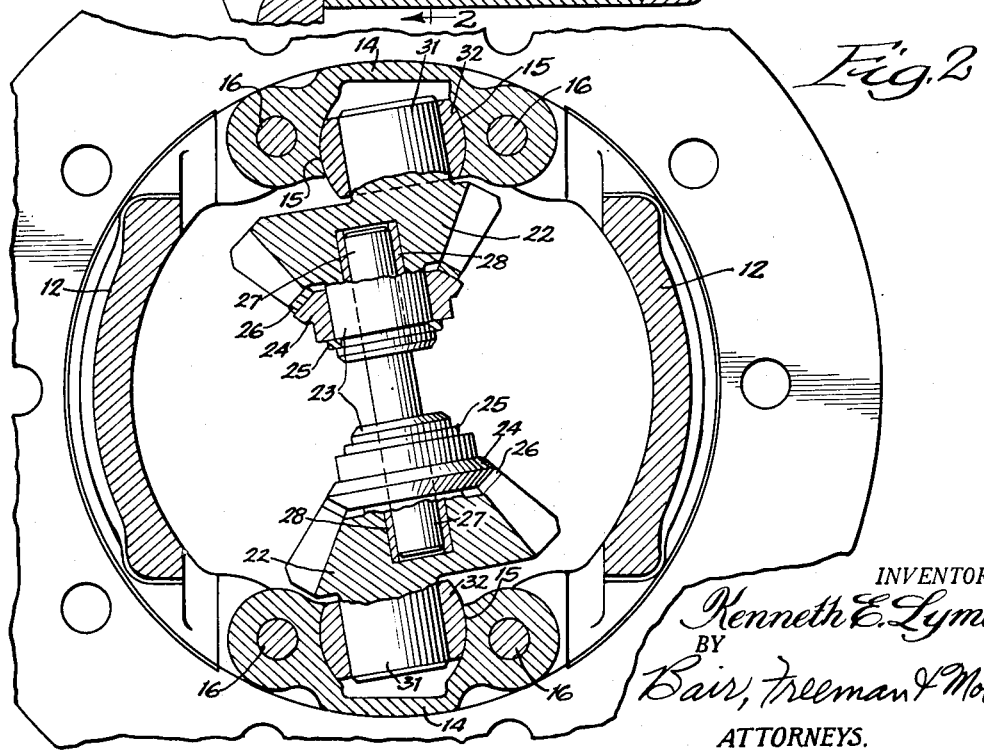

The above and other objects and advantages of the invention will be more readily apparent when read in connection with the accompanying drawing, in which:

Figure 1 is an axial section with parts in elevation of a differential embodying the invention; and Figure 2 is a transverse section on Line 2—2 of Figure 1, with the parts shown in a different position.

The differential, as shown, is adapted to provide a variable ratio between the shafts so that if the load on one shaft is less than that on the other, spinning of the unloaded shaft will not result. For this purpose, the differential comprises a housing indicated generally at 10 which may be cast or otherwise fabricated with tubular ends 11 upon which the housing can be supported for rotation. The ends 11 are rigidly connected by integral side portions 12 which extend at diametrically opposite points over only a portion of the circumference of the housing. The housing is completed by side bars 14 formed with axially extending ways having cylindrical sides 15 and which are supported in the housing by suitable intermating guide surfaces and locking pins 16. The housing, as shown and described, corresponds to that more fully disclosed and claimed in my co-pending application, Serial No. 377,603, filed August 31, 1953, now abandoned, although it will be understood for the purpose of the present invention, any housing having rigidly connected ends to support the side gears could be employed equally well.

The differential gearing itself includes a pair of identical bevel side gears 17 each of which is formed with a tubular hub 18 rotatably supported in a bore in one end of the housing. The hubs are internally splined, as indicated at 19, to receive the splined ends of oppositely extending shafts, such as the wheel shafts of a vehicle. The hubs 18 are of smaller diameter than the body portion of the gears and are joined thereto through annular shoulders which bear against annular supporting surfaces in the housing to limit outward movement of the side gears. Preferably, annular bearings 21 are mounted between these surfaces to take the thrust of the side gears.

The side gears mesh with bevel pinions 22, two of which are shown at diametrically opposite points. The bevel pinions are formed with integral inwardly extending hubs 23 which are concentric with the pinions and extend inward between the side gears. To prevent the pinions from moving radially outward between the side gears, each of the hubs 23 carries a thrust ring 24 terminating in an outwardly facing conical surface registering with the inner ends of the bevel teeth on the side gears. The thrust rings may be held on the hubs by suitable fastenings, such as snap rings 25. If desired, conical washers 26 may be mounted over the inner ends of the teeth on the side gears to provide a smooth continuous surface to be engaged by the thrust rings 24.

The pinions are connected and held against tilting by a guide rod 27 extending diametrically between the pinions and into hollow bores in the hubs 23 and the pinion bodies. The guide rod may engage bearing sleeves 28 in the hubs and pinions. With this construction radial outward thrust on the pinions is taken directly by the side gear teeth so that external bearings to absorb the pinion thrust are eliminated.

In the construction, as shown, wherein a variable ratio is obtained, each pinion is additionally provided with an external outwardly extending hub 31 eccentric to the axis of the pinion itself. The hubs 31 are journalled in blocks 32 which are formed with cylindrical side surfaces to engage the cylindrical surfaces 15. In this way, the blocks are supported for sliding movement axially of the case and for turning about axes parallel to the side gear axis. It will be noted that the blocks 32 are required to transmit only circumferential forces since radial thrust on the pinions is absorbed entirely by the side gears.

In order to absorb side thrust on the shafts which are connected to the side gears, each of the side gears is provided with internal stop means to engage the inner end of the shaft onto which it fits. As shown, the stop means are provided by snap rings 33 fitting into grooves in the side gears adjacent to the inner ends thereof. When the splined shafts are mounted in the side gears their ends will abut the snap rings 33 thereby to limit inward movement of the shafts into the side gears.

In operation, the housing will be turned in the usual manner through a ring gear, or the like, not shown, to drive the two shafts connected to the side gears. In the event of side thrust between the shafts, inward movement of the shafts will be limited by their ends engaging the snap rings 33. The thrust will be transmitted to one side gear through the bevel pinions themselves to the opposite gear without requiring any block or other parts in the central part of the unit to transmit thrust. It will be noted that the pinions can transmit axial thrust since outward movement thereof is restrained by the thrust rings 24 engaging the washers 26. This prevents the transmission of any thrust to the blocks 32 so that the blocks can be freely guided for axial and turning movements.

In the event the load on one shaft is less than that of the other, the side gears will tend to turn relative to each other and will turn the pinions about their own axes. The normal balance condition is shown in Figure 2 wherein the hubs 31 lie in the same plane transverse to the side gear axis. As the pinions turn to the position of Figure 1, the hubs 31 will reach the ninety degree position illustrated wherein the torque is unequally divided with greater torque being transmitted to the left-hand side gear than to the right-hand side gear. In this way, both shafts will continue to be turned even though they are unequally loaded so that slipping of wheels in a vehicle is eliminated or minimized.

While the invention has been described in connection with a ratio changing differential, it will be apparent that the advantages of eliminating the center block and transmitting side thrust between the shafts directly through the gears themselves are equally important in differentials or other types. It is therefore not intended that the invention should be limited to the exact structure shown or otherwise than by the terms of the appended claims.

What is claimed is:

1. A differential gear set comprising a pair of coaxial bevel side gears mounted with their toothed surfaces facing and each having a hollow central portion to receive a shaft, means to hold the side gears against axial separation, bevel pinions meshing with the side gears, means on the pinions engaging the side gears to hold the bevel pinions against radial outward movement, a radially extending guide rod journaled in the pinions and extending between the side gears to guide the pinions, and stop means in the hollow central portion of each side gear to engage the end of a shaft fitting in the hollow central portion to limit axial movement of the shaft into the side gear.

2. A differential gear set comprising a pair of coaxial bevel side gears mounted with their toothed surfaces facing and each having a hollow central portion to receive a shaft, means to hold the side gears against axial separaion, bevel pinions meshing with the side gears, thrust rings on the pinions engaging the inner ends of the side gear teeth to hold the bevel pinions against radial outward movement, a radially extending guide rod journaled in the pinions and extending between the side gears to guide the pinions, the hollow side gears being internally splined to receive splined shafts, and a snap ring in each side gear adjacent to its inner face to limit movement of the shafts axially into the side gears.

3. A differential gear set comprising a pair of coaxial bevel side gears mounted with their toothed surfaces facing and each having a hollow central portion to receive a shaft, means to hold the side gears against axial separation, bevel pinions meshing with the side gears, a hub on each of the pinions extending radially inward between the side gears, a thrust ring secured to each hub and registering with the ends of the side gear teeth to hold the pinions against radial outward movement, and stop means in the hollow central portion of each side gear to engage the end of a shaft in the side gear and limit axial movement of the shaft into the side gear.

4. A differential gear set comprising a housing, a pair of coaxial bevel side gears mounted in the housing with their toothed surfaces facing and each having a hollow central portion to receive a shaft, bevel pinions meshing with the side gears, means to hold the pinions against radial outward movement, a radially extending guide rod journalled in the pinions to hold the pinions against tilting, blocks mounted in the casing for axial sliding movement and for turning about axes parallel to the side gear axis, a hub on each of the pinions extending outward therefrom and eccentric to the pinions, the hubs being journalled in the blocks respectively, and stop means in the hollow central portion of each side gear to engage the end of a shaft received in the side gear and limit axial movement of the shaft into the side gear.

5. A differential gear set comprising a housing having rigidly connected ends, a pair of coaxial side gears mounted in the housing adjacent to the ends respectively, bearing parts on the side gears and the housing to limit axial movement of the side gears outward of the housing, pinions meshing with the side gears, a hub on each of the pinions extending radially inward between the side gears, and a thrust ring secured to each of the hubs and extending into registry with the pinion teeth to bear against the inner ends of the side gear teeth and hold the pinions against radially outward movement.

6. A differential gear set comprising a housing having rigidly connected ends, a pair of coaxial bevel side gears mounted in the housing adjacent to the ends, bearing parts on the housing and the side gears to limit axial movement of the side gears outward of the housing, bevel pinions meshing with the side gears, a hub on each of the bevel pinions extending radially inward between the side gears, a thrust ring secured to each of the hubs and formed with an outwardly facing conical surface registering with the inner ends of the teeth on the side gears, and conical washers fitting over the inner ends of the side gear teeth and which are engaged by the thrust rings to limit radially outward movement of the pinions.

7. A differential gear set comprising a pair of coaxial bevel side gears mounted with their toothed surfaces facing, means connecting the side gears to hold them against axial separation, bevel pinions meshing with the side gears, a hub on each of the pinions extending radially inward between the side gears, and a conical thrust ring secured to each hub and registering with the inner ends of the teeth on the side gears to hold the pinions against radial outward movement.

8. A differential gear set comprising a housing having rigidly connected ends, a pair of coaxial bevel side gears mounted in the housing adjacent to the ends, bearing parts on the housing and the side gears to limit axial movement of the side gears outward of the housing, bevel pinions meshing with the side gears, a hub on each of the bevel pinions extending radially inward between the side gears, a thrust ring secured to each of the hubs and registering with the inner ends of the side gear teeth to hold the pinions against radial outward movement, a second hub on each of the pinions extending outward therefrom on an axis eccentric to the pinion axis, and blocks slidable axially of the housing in which the second hubs are journalled to transmit circumferential forces from the pinions to the housing.

9. A differential gear set comprising a housing having rigidly connected ends, a pair of coaxial bevel side gears mounted in the housing adjacent to the ends, bearing parts on the housing and the side gears to limit axial movement of the side gears outward of the housing, bevel pinions meshing with the side gears, a hub on each of the bevel pinions extending radially inward between the side gears, a thrust ring secured to each of the hubs and registering with the inner ends of the side gear teeth to hold the pinions against radial outward movement, a second hub on each of the pinions extending outward therefrom on an axis eccentric to the pinion axis, blocks slidable axially of the housing in which the second hubs are journalled to transmit circumferential forces from the pinions to the housing, and radially extending guide rods journalled in the first named hubs to hold the pinions against tilting.

10. A differential gear set comprising a housing having rigidly connected ends, a pair of coaxial bevel side gears mounted in the housing adjacent to the ends, bearing parts on the housing and the side gears to limit axial movement of the side gears outward of the housing, bevel pinions meshing with the side gears, a hub on each of the bevel pinions extending radially inward between the side gears, a thrust ring secured to each of the hubs and registering with the inner ends of the side gear teeth to hold the pinions against radial outward movement, a second hub on each of the pinions extending outward therefrom on an axis eccentric to the pinion axis, blocks slidable axially of the housing and formed with cylindrical sides fitting against complementary surfaces in the housing so that the blocks can turn about axes parallel to the side gear axis, the second hubs being journalled in the blocks respectively, and radially extending guide rods journalled in the first named hubs to hold the pinions against tilting.

References Cited in the file of this patent

UNITED STATES PATENTS

| | | |
|---|---|---|
| 1,067,144 | Schilling | July 8, 1913 |
| 1,415,606 | Nilson et al. | May 9, 1922 |
| 1,431,572 | Dodge | Oct. 10, 1922 |
| 1,446,545 | Brush et al. | Feb. 27, 1923 |
| 1,750,981 | Wildhaber | Mar. 18, 1930 |
| 1,888,656 | Boynton | Nov. 22, 1932 |
| 1,948,095 | Boynton | Feb. 20, 1934 |

FOREIGN PATENTS

| | | |
|---|---|---|
| 298,228 | Great Britain | Sept. 8, 1929 |